United States Patent [19]

Rigaux

[11] Patent Number: 5,736,853
[45] Date of Patent: Apr. 7, 1998

[54] AXIALLY COMPACT BEARING WITH SPEED-DETECTING DEVICE

[75] Inventor: Christian Rigaux, Artannes-sur-Indre, France

[73] Assignee: SKF France, Clamart, France

[21] Appl. No.: 615,000

[22] Filed: Mar. 13, 1996

[30] Foreign Application Priority Data

Mar. 28, 1995 [FR] France .................. 95 03615

[51] Int. Cl.[6] .................. G01P 3/488; F16C 33/30
[52] U.S. Cl. .................. 324/173; 384/448
[58] Field of Search .................. 324/173, 174, 324/166, 207.2, 207.25, 207.21, 207.23, 207.26, 1; 384/448, 446

[56] References Cited

U.S. PATENT DOCUMENTS

| | | | |
|---|---|---|---|
| 4,865,468 | 9/1989 | Kato et al. | 384/448 |
| 4,938,612 | 7/1990 | Yamada | 384/446 |
| 5,004,980 | 4/1991 | Ida et al. | 324/207.25 |
| 5,121,998 | 6/1992 | Bhatia | 384/448 |
| 5,129,743 | 7/1992 | Faye et al. | 324/207.25 |
| 5,287,738 | 2/1994 | Polinsky et al. | 384/448 |

FOREIGN PATENT DOCUMENTS 0 397 309  11/1990  European Pat. Off. .
2 232 252  12/1990  United Kingdom .

*Primary Examiner*—Sandra L. O'Shea
*Assistant Examiner*—Jay M. Patidar
*Attorney, Agent, or Firm*—Beveridge, DeGrandi, Weilacher & Young

[57] ABSTRACT

A rolling-contact bearing has a speed-detecting device which includes a sensor which is fixed to a non-rotating race of the bearing, and an encoder element which is mounted on a subassembly which includes two rotating races. The rolling elements of the bearing are held by two axially spaced cages. The encoder element has an active part and a radial part which supports the active part. The radial part extends between the two cages. The active part of the encoder element has an axial dimension which is greater than the axial distance between the two cages.

9 Claims, 3 Drawing Sheets

AXIALLY COMPACT BEARING WITH SPEED-DETECTING DEVICE

The present invention relates to rolling-contact bearings with two rows of rolling elements equipped with a built-in device for detecting the speed of rotation comprising an encoder integral with the rotating members of the bearing and a sensor integral with the non-rotating members of the bearing. Such a device may, for example, be mounted on a vehicle wheel bearing coupled to an anti-lock braking system of the ABS type.

BACKGROUND OF THE INVENTION

British Patent Application GB 2,232,252 makes known a rolling-contact bearing with two rows of balls comprising a non-rotating outer race and two rotating inner races. The encoder element is fixed to one of the rotating inner races, on an outside diameter thereof, so that it lies inside the bearing between the two raceways. The sensor is fixed to the non-rotating outer race of the bearing in a hole passing radially through the wall of the said race. The head of the sensor emerges inside the bearing facing the encoder element.

A drawback of this type of encoder lies in the fact that it is not suited to applications requiring limited axial space. Indeed, the active part of the encoder element is situated radially in immediate proximity to the inner races. The sensor stretches between the cages of the two rows Of balls, which means that the cages must be axially separated by a distance greater than the diameter of the head of the sensor. This arrangement is not satisfactory from the point of view of the axial size of the bearing.

SUMMARY OF THE INVENTION

The objective of the invention is therefore to produce a rolling-contact bearing equipped with a device for detecting the speed of rotation of the type described previously, in which the cages are arranged a small axial distance apart.

Another objective of the invention is to produce a rolling-contact bearing equipped with a device for detecting the speed of rotation which is particularly compact.

Another objective of the invention is to produce a rolling-contact bearing in which the encoder and the sensor are very well protected from the outside elements.

Another objective of the invention is to produce a rolling-contact bearing equipped with a device for detecting the speed of rotation, in which the encoder is simple to produce.

According to the invention, the rolling-contact bearing with two rows of rolling elements held by cages comprises a non-rotating race, two rotating races and a built-in device for detecting the speed of rotation, which is of the type comprising a sensor fixed to the non-rotating race and past which there files in rotation, and with a slight air gap, an encoder element integral with the rotating races and capable of producing in the sensor a periodic signal of frequency proportional to the speed of rotation of the rotating races. The encoder element comprises a radial part arranged between the cages and supporting the active part. The active part of the encoder element is arranged in an annular space between the annular surface of the non-rotating race separating the raceways and the outer surface of the cages which is situated between the two rows of rolling elements, the axial dimension of the active part of the encoder element being greater than the remaining axial space lying between the two cages.

In one embodiment of the invention, the sensor is substantially flush with the annular surface of the non-rotating race separating the raceways.

In one embodiment of the invention, a portion of the radial part of the encoder element is gripped between the two rotating inner races. Advantageously, the bore of the radial part of the encoder is centred on an inner race forming a hub.

In one embodiment of the invention, the radial part of the encoder is extended by a cylindrical part fitted onto one race of the bearing.

In one embodiment of the invention, the active part of the encoder element is supported by the outer periphery of the radial part of the said encoder element.

In one embodiment of the invention, the encoder element comprises a cylindrical part arranged close to the sensor and supporting the active part of the said encoder element.

In one embodiment of the invention, the active part of the encoder element consists of a plurality of notches or of openings.

In another embodiment of the invention, the active part of the encoder element comprises a ring made of elastomer filled with magnetic particles.

Thus, by virtue of the invention, a rolling-contact bearing is obtained which has a small axial dimension because the cages are axially close together, and the bearing is one in which the encoder is of sufficient size to produce a satisfactory magnetic field.

BRIEF DESCRIPTION OF THE DRAWING FIGURES

The invention will be better understood from studying a few embodiments described by way of non-limiting example and illustrated by the appended drawings, in which.

DETAILED DESCRIPTION

Figure 1:
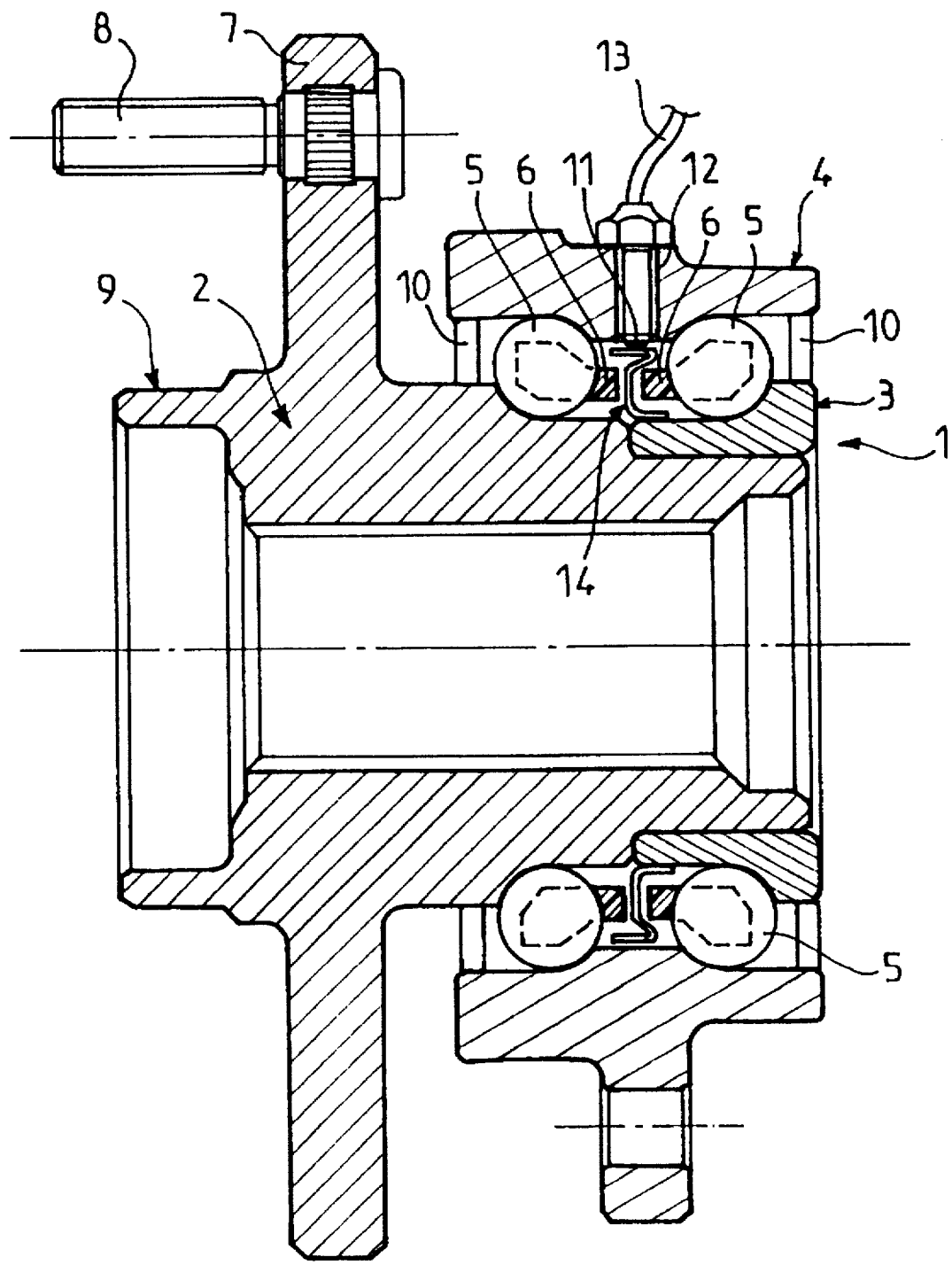
FIG. 1 is a view in axial section of a vehicle wheel hub equipped with a rolling-contact bearing with a device for detecting the speed of rotation according to the invention.
Figure 2:
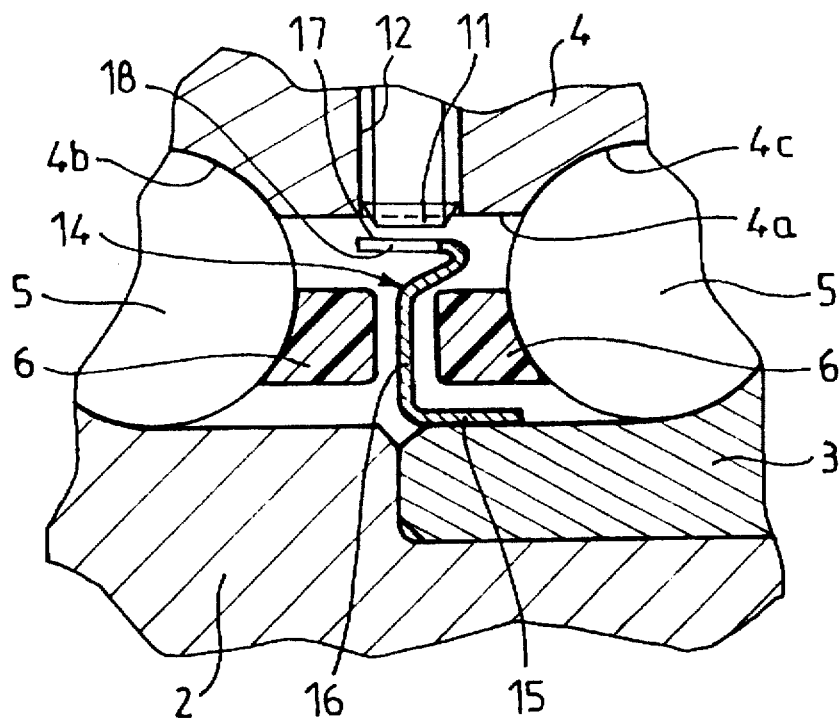
FIG. 2 is a detail of the bearing of FIG. 1.

As illustrated in FIGS. 1 and 2, the rolling-contact bearing 1 comprises two rotating inner races 2, 3, a non-rotating outer race 4, and rolling elements such as balls 5 held by cages 6. The rotating inner race 2 forms the hub of the wheel and comprises an annular flange 7 on which the wheel fixing and bolts 8 are mounted, and bearing surfaces 9 for centring and fixing the wheel. The bearing 1 also comprises sealing means 10, for example seals intended to protect the rolling elements 5 from the ingress of outside elements into the bearing and, if need be, preserve the grease contained within the bearing 1.

The sensor 11 is fixed to the non-rotating outer race 4 of the bearing 1, in a hole 12 passing radially through the wall of the said race 4, the head of the sensor 11 lying flush with the annular surface 4a of the non-rotating race 4, defined between the raceways 4b and 4c of the rolling elements 5. The sensor 11 is connected by a cable 13 to an information processing device which has not been represented. The encoder 14 is made, for example, of magnetic sheet metal and comprises a cylindrical part 15 fitted onto the annular surface of the rotating race 3 situated between the raceways, a radial part 16 stretching from the cylindrical part 15 towards the sensor 11 and arranged between the cages 6 which hold the balls 5. Since the encoder 14 and, in particular, its radial part 16, are made of thin sheet metal, the cages 6 may be axially very close together. The encoder comprises a cylindrical part 17 supported by the radial part 16 and arranged close to the annular surface 4a of the race 4 defined between the raceways 4b and 4c, facing and a small distance from the sensor 11. The cylindrical part 17 constitutes the active part of the encoder 14, is provided with notches 18 and is arranged in the annular space defined between the annular surface 4a of the race 4 and the outer surface of the cages 16 which is situated between the two rows of rolling elements. The axial dimension of the cylindrical part 17 is greater than the axial distance separating the cages 6 from each other.

Figure 3:
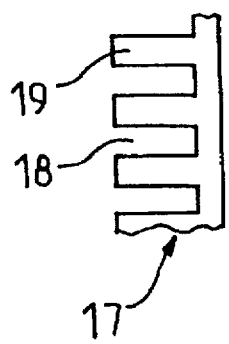
FIG. 3 is an external view of the encoder mounted in the bearing of FIG. 2.

As illustrated in FIG. 3, the cylindrical part 17 of the encoder 14 comprises a plurality of notches 18 which define teeth 19. In rotation, the filing of the notches 18 and of the teeth 19 successively past the sensor 11 produces in the sensor 11 a periodic signal of frequency proportional to the speed of rotation of the rotating races 2, 3.

Figure 4:
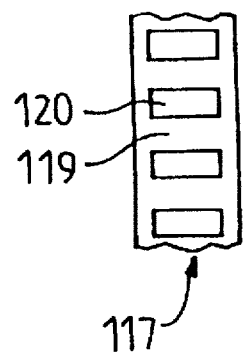
FIG. 4 is an alternative form of the encoder of the previous figure.

FIG. 4 illustrates an alternative form of the encoder for which the references of elements which are similar to those represented in the previous figures have been increased by the number 100. The cylindrical part 117 of the encoder comprises a plurality of openings 120 between which teeth 119 are defined. As before, in rotation the successive passage of teeth 119 and of openings 120 past the sensor produces in the sensor a signal of frequency proportional to the rotation of the rotating races of the bearing.

Figure 5:
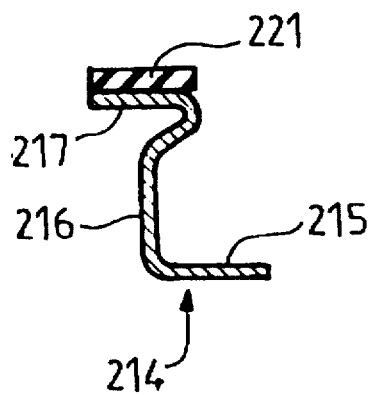
FIG. 5 is a view in axial section of another alternative form of the encoder.

In FIG. 5, the references of elements which are similar to the elements of FIGS. 1 to 3 have been increased by the number 200. The encoder 214 comprises a cylindrical part 215 intended to be fitted onto the outside diameter of an inner race of a bearing, a radial part 216 stretching towards the outer race and intended to be housed between the cages of the bearing and a cylindrical part 217 intended to face a sensor. Overmoulded onto the outside diameter of the cylindrical part 217 is an elastomer ring 221. The elastomer ring 221 is filled with magnetic particles and constitutes the active part of the encoder 214.

Figure 6:
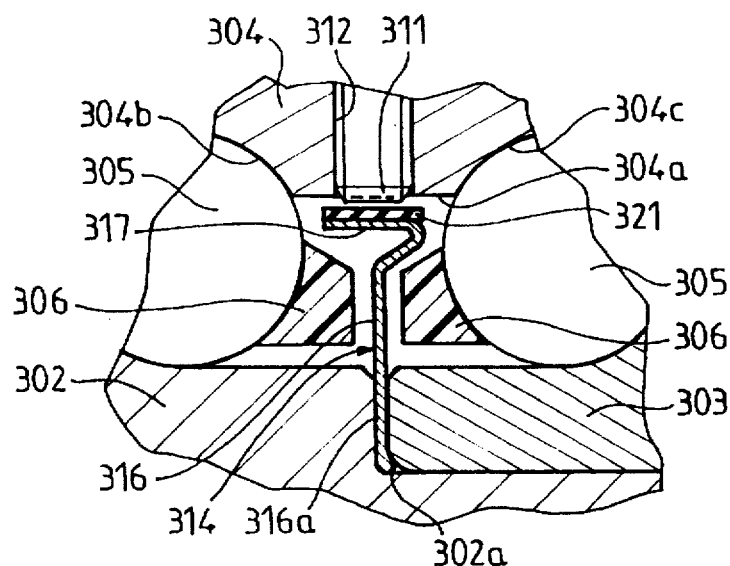
FIG. 6 is a detail in axial section of the bearing according to another embodiment of the invention.

In FIG. 6, the references of elements which are similar to the elements of FIGS. 1 to 3 have been increased by the number 300. The encoder 314 comprises a radial part 316, a cylindrical part 317 supported by the radial part 316 and onto which there is overmoulded an elastomer ring 321 arranged facing the Sensor 311. The cylindrical part 317 and the elastomer ring 321 are arranged in an annular space between the annular surface 304a of the non-rotating race 304 separating the raceways 304b and 304c and the outer surface of the cages 306 for holding the balls 305 which is situated between the two rows of balls 305. A portion 316a of the radial part 316 of the encoder 314 is gripped between the non-rotating races 302 and 303 of the bearing. Such an arrangement makes it possible to place the cages 306 in immediate proximity to the rotating races 302 and 303, which makes it possible to reduce the radial size of the bearing. The bore of the radial part 316 of the encoder 314 is centred on a bearing surface 302a of the race 302 forming the hub. In this way, the encoder 314 is fixed accurately when the bearing is fitted, and runs no risk of shifting thereafter.

Figure 7:
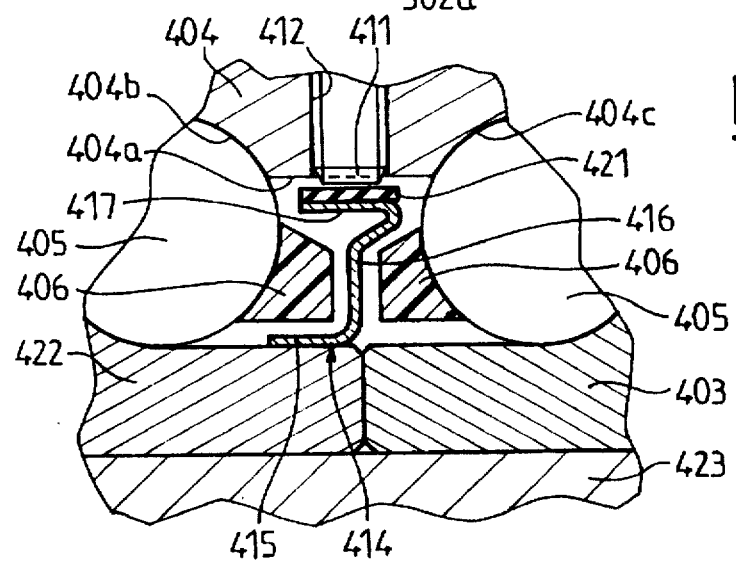
FIG. 7 is a detail in axial section of a bearing according to another embodiment of the invention.

In FIG. 7, the references of elements mentioned in FIGS. 1 to 3 have been increased by the number 400. The bearing comprises two inner races 403 and 422 fitted over the external periphery of a shaft 423. The encoder 414 comprises a cylindrical part 414 fitted over the race 422, a radial part 416, a cylindrical part 417 and an elastomer ring 421 comprising magnetic particles and overmoulded onto the cylindrical part 417. By way of an alternative, the encoder 314 as illustrated in FIG. 6 could just as easily be mounted between the two inner races 403 and 422 and be centred on the shaft 423.

Figure 8:
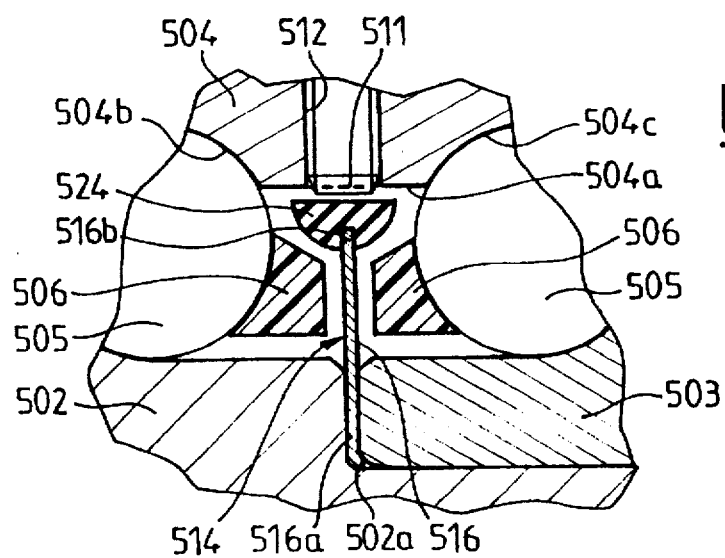
FIG. 8 is a detail in axial section of the bearing according to another embodiment of the invention.

In FIG. 8, the references of the elements mentioned in FIGS. 1 to 3 have been increased by the number 500. The encoder 514 comprises a radial part 516, the smaller-diameter portion 516a of which is gripped between the races 502 and 503 and is centred on the bearing surface 502a of the race 502. The active part of the encoder 514 consists of an elastomer ring 524 comprising magnetic particles and overmoulded onto the outer periphery 516b of the radial part 516 of the encoder element 514. The ring 524 is arranged in an annular space between the annular surface 504a of the non-rotating race 504 separating the raceways 504b and 504c for the balls 505 and the outer surface of the capes 506 which is situated between the two rows of balls 505. The axial dimension of the ring 524 is greater than the remaining axial space lying between the two cages 506. This embodiment is particularly simple to implement and makes it possible to create a satisfactory magnetic field in a rolling-contact bearing of reduced size.

By virtue of the invention, and irrespective of the form of embodiment, the rolling-contact bearing equipped with a device for detecting the speed of rotation is particularly compact and well protected against the external elements. The active part of the encoder is of sufficient size to generate a correct signal in the sensor. In addition, the way in which the encoder is fixed to the rotating members of the bearing is very robust and runs no risk of becoming damaged in service.

I claim:

1. Rolling-contact bearing comprising a non-rotating race, two rotating races including raceways, two rows of rolling elements, two cages for holding said rolling elements, an axial space between the two cages, a built-in device for detecting the speed of rotation including a sensor fixed to the non-rotating race and an encoder element fixed to and rotatable with the rotating races, said encoder element moving in rotation past said sensor with a slight air gap therebetween, said encoder element being operable to produce in the sensor a periodic signal of a frequency proportional to the speed of rotation of the rotating races, said encoder element including a radial part arranged in the axial space between the cages and an active part supported by said radial part, said active part being arranged in an annular space which is located between an annular surface of the non-rotating race between the raceways and an outer surface of the cages which is situated between the two rows of rolling elements, said active part of the encoder element having an axial dimension which is greater than the axial dimension of the axial space between the two cages.

2. Rolling-contact bearing according to claim 1, wherein the sensor is substantially flush with the annular surface of the non-rotating race separating the raceways.

3. Rolling-contact bearing according to claim 1, wherein a portion of the radial part of the encoder element is gripped between the two rotating races.

4. Rolling-contact bearing according to claim 3, wherein the radial part of the encoder element has a bore which is centered on an inner race which forms a hub.

5. Rolling-contact bearing according to claim 1, wherein the radial part of the encoder element is extended by a cylindrical part fitted onto one race of the bearing.

6. Rolling-contact bearing according to claim 1, wherein the active part of the encoder element is supported on an outer edge of the radial part of said encoder element.

7. Rolling-contact bearing according to claim 1, wherein the encoder element includes a cylindrical part arranged close to the sensor and supporting the active part of the said encoder element.

8. Rolling-contact bearing according to claim 1, wherein the active part of the encoder element is provided with a plurality of notches or openings.

9. Rolling-contact bearing according to claim 1, wherein the active part of the encoder element includes a ring made of elastomer filled with magnetic particles.

* * * * *